United States Patent

[11] 3,624,277

[72] Inventor King B. Drake
Los Angeles, Calif.
[21] Appl. No. 60,501
[22] Filed Aug. 3, 1970
[45] Patented Nov. 30, 1971
[73] Assignee Dracon Industries
Chatsworth, Calif.
Continuation-in-part of application Ser. No. 834,111, June 17, 1969. This application Aug. 3, 1970, Ser. No. 60,501

[54] TELEPHONE CONNECTOR RETAINING COVER
16 Claims, 5 Drawing Figs.

[52] U.S. Cl. .......... 174/138 F, 339/36
[51] Int. Cl. .......... H01b 17/00, H05k 5/03
[50] Field of Search .......... 174/48, 66, 67, 92, 138 F; 339/36, 116 R, 198 J; 179/178, 184, 186

[56] References Cited

UNITED STATES PATENTS

| | | | |
|---|---|---|---|
| 2,526,606 | 10/1950 | Gregg | 174/67 |
| 2,855,578 | 10/1958 | Hirsch | 339/36 |
| 3,147,338 | 9/1964 | Ekvall et al. | 174/138 F |
| 3,499,102 | 3/1970 | Gillemot et al. | 174/138 F |

FOREIGN PATENTS

| | | | |
|---|---|---|---|
| 413,919 | 12/1966 | Switzerland | 174/138 F |

*Primary Examiner*—Laramie E. Askin
*Attorney*—Allan M. Shapiro

ABSTRACT: A telephone connector retaining cover with sides, ends and top. The cavity is of sufficient size to accept a telephone connector. The ends have openings for the cord and cable secured to the telephone connector. Interiorly, the cover has resilient retaining latches which snap onto the telephone connector assembly to retain it in the cover. The top carries indicia, including a molded-in partial outline of the telephone connector to indicate the proper position of the connector in the cover. The indicia include words indicating which end is the cord end. Furthermore, retention means is provided in the cover at its four corners to hold the cover in place. These retention means preferably are means for retaining magnets in place, which magnets retain the cover against metal desks or walls. Alternatively, the retention means engages a base which is secured to the wall by any conventional means.

INVENTOR.
KING B. DRAKE

BY Allan M. Shapiro

ATTORNEY

TELEPHONE CONNECTOR RETAINING COVER

CROSS REFERENCE

This application is a continuation-in-part of pending U.S. Pat. application Ser. No. 834,111, filed June 17, 1969, by King B. Drake.

BACKGROUND OF THE INVENTION

1. Field of the Invention

This invention is directed to the telephone arts and particularly a cover for a telephone connector between a cable and a cord, adjacent to the subscriber's set. The telephone connector is releasably secured to the retaining cover.

2. Description of the Prior Art

In most offices, the subscriber's rests upon a desk. The cord from the set extends to a telephone connector, and a cable from the connector extends away to a junction point. Oftentimes, the desk is away from the wall and away from the junction point. Thus, the cord or the cable must extend from the telephone to the junction point, often across the office floor. When the telephone connector is in such an arrangement, inadvertent engagement on the telephone cable, or the telephone cord, as by a floor mop or sweeper, causes the connector to be pulled about. When the connector is mounted on a desk side, and is covered by the cover of the above-identified pending application, the prior telephone connector cover may be pulled away from the point where it is retained, and the cover separated from the telephone connector. While the breaking away of the cover, and the telephone connector covered and retained thereby, is often helpful to prevent a person from stumbling and falling, the falling away of the cover from the telephone connector is unnecessary and inconvenient, often resulting in service calls by telephone company maintenance men to replace the telephone connector and cover.

SUMMARY OF THE INVENTION

In order to aid in the understanding of this invention, it can be stated in essentially summary form that it is directed to a telephone connector retaining cover, the cover having ends, sides and top to define a cavity or recess in which can be positioned a telephone connector. Telephone connector engagement or latch means is provided in the cover to releasably interengage with a telephone connector assembly. The telephone connector retaining cover preferably has indicia therein to indicate the proper positioning of the telephone connector assembly in the retaining cover. Additionally, fastening means is provided for fastening the retaining cover in place, wherever the telephone connector is to be positioned.

Accordingly, it is an object of this invention to provide a telephone connector retaining cover in which is releasably securable a telephone connector, with the cover being fastenable to retain the cover and the telephone connector in a desired position. It is another object to provide a retaining cover with indicia thereon, which indicia show the proper relationship for orientation of the telephone connector within the retaining cover to facilitate interengagement. It is a further object to provide a telephone connector retaining cover integrally molded of synthetic polymer composition material, with telephone connector retaining means therein of such resiliency as to releasably engage a telephone connector. It is still another object of this invention to provide securing means withing the retaining cover, which securing means can attach the retaining cover to a base.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

DESCRIPTION OF THE PREFERRED EMBODIMENT

Figures 1, 2, 3, 4, 5:
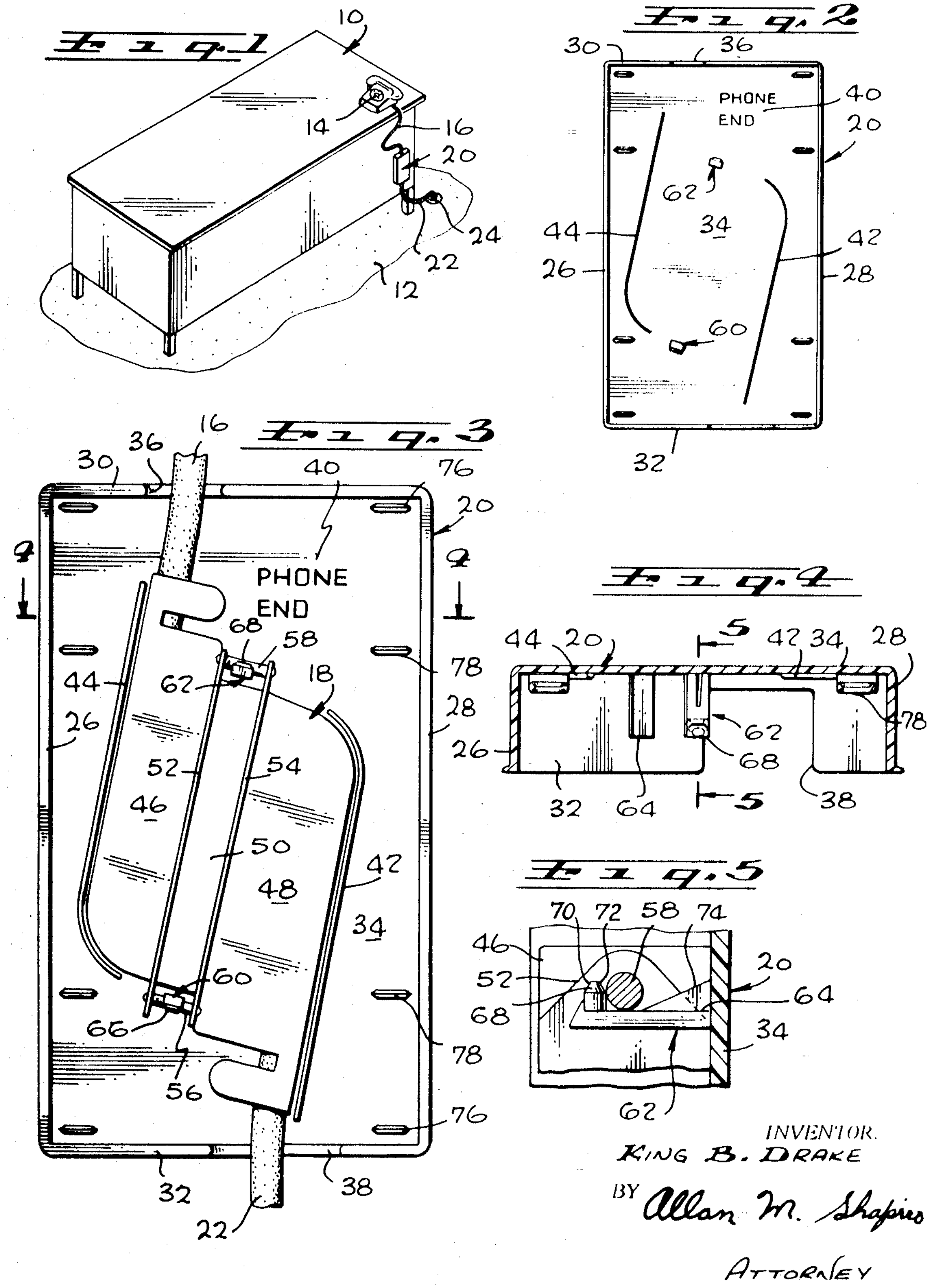
FIG. 1 is a perspective view of a desk, carrying a subscriber's set and having a telephone connector retaining cover, in accordance with this invention, mounted on the side of the desk.
FIG. 2 is an enlarged rear elevational view of a telephone connector retaining cover of this invention, showing line indicia on the inside surface of the cover top to facilitate orientation of the connector assembly.
FIG. 3 is an enlarged view, similar in aspect to FIG. 2, illustrating a telephone connector assembly in association with a retaining cover of this invention, and showing the line indicia in the form of molded ridges.
FIG. 4 is a sectional view, partly in elevation, taken in the direction of arrows 4—4 in FIG. 3, but without the connector assembly.
FIG. 5 is an enlarged section taken generally along the line 5—5 of FIG. 4, with the connector assembly in its retained location.

In the drawings, the same or similar elements bear the same or similar reference numerals.

In FIG. 1, desk 10 is shown as being in an office having a floor 12. The subscriber's telephone instrument 14 rests on the desk and its cord 16 extends to a conventional telephone connector assembly (indicated generally at 18 in FIG. 3), which is enclosed in telephone connector retaining cover 20 of this invention. From connector 18, telephone cable 22 extends away to a junction point, often passing through the floor opening 24, as illustrated, or, in other cases, passing through a wall opening to the junction point. Whether the desk 10 is metal or wood, the telephone connector cover 20 is removably securable to the desk via means such as magnets or a fastener plate in a manner such as is disclosed in the above-identified copending U.S. Pat. application Ser. No. 834,111.

The telephone connector retaining cover 20 is best seen in FIGS. 2 through 5. As shown in FIGS. 2 and 3, it is a rectangular, parallelepiped having sides 26 and 28, ends 30 and 32, and a planar top 34. These five elements define an open-sided recess or cavity within which the telephone connector assembly can be disposed. Thus, the ends and sides are of sufficient width and the top is sufficiently thin to accept the telephone connector assembly within the recess. End 30 has notch 36, so that cord 16 can pass therethrough when the telephone connector is positioned as shown in FIG. 3. Similarly, end 32 has notch 38, so that telephone cable 22 can pass therethrough. Notch 38 is sufficiently large that cord 16 can be bent inside cover 20 to extend around and past connector 18 and out of notch 38, together with cable 22, in those cases where it is not desired to pass cord 16 through its normal notch 36 because of some exterior obstruction.

As seen in FIG. 2, the proper positioning of the telephone connector assembly within the recess in cover 20 is indicated by the printed words "phone end" referenced at 40, adjacent notch 36, which indicates the proper end for passage of telephone cord 16. Additionally, indicia 42 and 44 comprise lines printed on the top 34 which indicate the correct outline position of connector 18 with respect to the cover. The indicia 40, 42 and 44 can be formed in any convenient manner but, as seen in FIGS. 3–5, preferably are molded as raised ridges on the undersurface of top 34 so as to be integrally molded with the cover 20.

The telephone connector 18 is a standard 25-pair connector assembly commonly used in the cord-to-cable junction for telephones in business offices. Thus, the telephone connector assembly comprises a telephone cord connector portion 46, a telephone cable connector portion 48, and an intermediate connector portion 50 sandwiched between portions 46 and 48. Conventionally, respective flanges 52 and 54 of connector portions 46 and 48 are secured to each other by machine screws 56 and 58 adjacent opposite ends of portion 50 to prevent inadvertent separation of the connector portions. Flanges 52 and 54 project out from the connector portions, and screws 56 and 58 are spaced laterally from the intermediate connector portion 50, so that the sides of the screws 56 and 58 are unobstructed and available for practicing the latching aspects of this invention as described below in detail.

As seen in FIGS. 2–5, a pair of posts 60 and 62 project uprightly from the top plate 34 into the cavity of cover 20 and are integral with the cover. Posts 60 and 62 are located and spaced with respect to each other and screws 56 and 58 so that their outwardly facing surfaces, as surface 64 on post 62 best seen in FIGS. 4 and 5, are spaced from each other a distance substantially equal to the distance between screws 56 and 58. Thus, posts 60 and 62 can extend through the connector 18 through the clearance spaces between the screws and the intermediate connector portion 50. Posts 60 and 62 are provided at their free ends with respective detent portions 66 and 68 which project laterally outwardly.

Post 62, which is identical to post 60, is best seen in FIGS. 4 and 5 and will be described in more detail in reference thereto. Detent projection 68 is positioned at the end of post 62 so as to engage over screw 58 in a latched manner. Post 62 is somewhat resilient in the lateral direction so that, when the connector is pressed into the cover cavity toward top 34, screw 58 bears against sloped surface 70 on detent projection 68 and deflects post 62 laterally enough for screw 58 to pass detent projection 68, whereupon the latter snaps over screw 58 for retention engagement. When desired, removal of the connector is accomplished by merely pulling the connector 18 and cover 20 apart, with post 62 automatically deflecting laterally to release the engagement, such release being facilitated by opposite sloped surface 72 on the detent 68. A rib 74 strengthens the junction of post 62 and top plate 34.

The posts are so positioned on the top 34 that, when the telephone connector 18 is placed in the recess in cover 20, the posts 60 and 62 properly engage the screws of the connector when the cord end of the connector is toward the cord end of the cover 20 and when the cord 16 and cable 22 are directed toward their respective notches 36 and 38. Thus, the cover is releasably retained on connector 18, and the posts 60 and 62 are sufficiently strong as to prevent the usual inadvertent separation. Thus, securement of the cover in place also secures the connector 18 in place.

In each of the four corners of top 34, adjacent the junctures between the ends and sides, the top is provided with retainers as at 76 and 78. The retainers are of such nature as to engage and retain the magnet holders of the above-identified prior application. By this means, magnets are retained in the four corners of the cover, with the result that the cover can be magnetically attached to a metal structure, such as the desk 10. By this means, the connector is retained in place.

If a person trips over the cable 22, or if cable 22 is inadvertently struck severely, the magnetically attached cover 20 normally will be pulled from the side of the desk. Since the posts 60 and 62 retain the cover on the connector, this joining is likely to stay together so that the cover and connector remain as a unit which is readily picked up and replaced against the desk 10. Should the cover come off the connector, it can be readily reinstalled in the correct orientation because of the indicia within the cover and the ease of the snap-action latching function of the retention posts, and then remounted on the desk.

Other attaching methods are disclosed in the above-identified prior application. Any of these methods can be equally well employed to secure the cover 20 in place. Thus, the cover may be releasably attached to a base which is secured to the desk, also by engagement with one or the other of retainers 76 and 78. Furthermore, if desired, knockouts can be provided in the cover 20 for directly attaching the cover to a desk or wall. In any kind of installation of the cover, it is desirable to retain the connector 18 therein by means of posts 60 and 62, properly orientated in accordance with the indicia.

It is economically convenient to manufacture the cover by injection molding it of synthetic polymer composition material. Suitable grades of polyvinyl chloride have the dimensional stability and the limited resiliency desired in this use. For example, lateral resilience is required in posts 60 and 62, and their structure can be modified in accordance with the allowable resiliency of the polymer composition material, so that proper latching of the posts onto the connector is accomplished. By this means, an economic structure of considerable utility and ease of use is produced.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A telephone connector retaining cover comprising:
sidewalls, end walls and a top joined together to provide a recess of sufficient size to accept a telephone connector, said end walls being notched to permit passage of a telephone cord extending from a telephone connector; and
resilient latch means in said cover having an engagement surface thereon for releasable latching over a portion of a telephone connector so that a telephone connector can be engaged therewith and retained by the latch means within said cover.

2. The telephone connector retaining cover of claim 1 wherein said latch means comprises first and second detents each having an engagement surface for latching over a portion of the telephone connector.

3. The telephone connector retaining cover of claim 2 wherein said detents comprise laterally resilient posts extending normally from said top, each of said posts having a lateral detent projection thereon and having an engagement surface on each of said detent projections, so that said posts are resiliently laterally deflectable for engagement of said detent projections over a portion of the telephone connector.

4. The telephone connector retaining cover of claim 3 including indicia means located on said cover to indicate the proper position of a telephone connector for retention in said recess of said telephone connector retaining cover.

5. The telephone connector retaining cover of claim 4 wherein said indicia means comprises first and second lines on said top of said cover located to form an outline for the telephone connector when a telephone connector is retained on said cover.

6. The telephone connector retaining cover of claim 5 wherein said cover is integrally molded of synthetic polymer composition material and said lines are integrally molded as ridges on said top.

7. The telephone connector retaining cover of claim 6 wherein retainer means are formed in said cover for engagement with means to secure said cover in place.

8. The telephone connector retaining cover of claim 1 including indicia means located on said cover to indicate the proper position of a telephone connector for retention in said recess of said telephone connector retaining cover.

9. The telephone connector retaining cover of claim 8 wherein said indicia means comprises first and second lines on said top of said cover located to form an outline for the telephone connector when a telephone connector is retained in said cover.

10. The telephone connector retaining cover of claim 9 wherein said cover is integrally molded of synthetic polymer composition material and said lines are integrally molded as ridges on said top.

11. A telephone connector retaining cover comprising:
sidewalls, end walls and a top joined together to provide a recess of sufficient size to accept a telephone connector, said end walls being notched to permit passage of a telephone cord extending from a telephone connector; and latch means in said cover, said latch means comprising first and second detents, said detents comprising laterally resilient posts extending normally from said top, each of said posts having a lateral detent projection thereon so that said posts are resiliently laterally deflectable for engagement of said detent projections over a portion of the telephone connector for releasable engagement with a telephone connector so that a telephone connector can be engaged therewith and retained within said cover.

12. The telephone connector retaining cover of claim 11 including indicia means located on said cover to indicate the proper position of a telephone connector for retention in said recess of said telephone connector retaining cover.

13. The telephone connector retaining cover of claim 12 wherein said indicia means comprises first and second lines on said top of said cover located to form an outline for the telephone connector when a telephone connector is retained on said cover.

14. The telephone connector retaining cover of claim 13 wherein said cover is integrally molded of synthetic polymer composition material and said lines are integrally molded as ridges on said top.

15. The telephone connector retaining cover of claim 14 wherein retainer means are formed in said cover for engagement with means to secure said cover in place

16. A telephone connector retaining cover comprising:

sidewalls, end walls and a top joined together to provide a recess of sufficient size to accept a telephone connector, said end walls being notched to permit passage of a telephone cord extending from a telephone connector;

latch means in said cover for releasable engagement with a telephone connector so that a telephone connector can be engaged therewith and retained within said cover; and indicia means comprising first and second lines on the top of said cover located to form an outline for a telephone connector to indicate the proper position of a telephone connector when a telephone connector is retained in said recess of said telephone connector retaining cover.

* * * * *